US012812270B2

(12) United States Patent
Ebihara

(10) Patent No.: US 12,812,270 B2
(45) Date of Patent: Nov. 24, 2026

(54) COLUMN AMPLIFIER TO SUPPORT DUAL CONVERSION GAIN AND DUAL ANALOG GAIN READOUT

(71) Applicant: OMNIVISION TECHNOLOGIES, INC., Santa Clara, CA (US)

(72) Inventor: Hiroaki Ebihara, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 79 days.

(21) Appl. No.: 18/896,058

(22) Filed: Sep. 25, 2024

(65) Prior Publication Data

US 2026/0089412 A1 Mar. 26, 2026

(51) Int. Cl.
*H04N 25/78* (2023.01)
*H04N 25/77* (2023.01)
*H04N 25/778* (2023.01)

(52) U.S. Cl.
CPC ............ *H04N 25/78* (2023.01); *H04N 25/77* (2023.01); *H04N 25/778* (2023.01)

(58) Field of Classification Search
CPC ....... H04N 25/78; H04N 25/778; H04N 25/77
USPC .......................................................... 348/308
See application file for complete search history.

(56) References Cited

U.S. PATENT DOCUMENTS 10,431,608 B2 * 10/2019 Ebihara ................ H04N 25/771
10,924,701 B2 2/2021 Ebihara et al.

* cited by examiner

*Primary Examiner* — Joel W Fosselman
(74) *Attorney, Agent, or Firm* — Dorsey & Whitney LLP

(57) ABSTRACT

Column amplifiers to support dual conversion gain readout and dual analog gain readout are disclosed herein. In some embodiments, a column amplifier for use in an image sensor can include an input node, and output node, and an input stage coupled between the input node and the output node. The input node can be coupled to receive image signals from one or more pixel circuits. The input stage can include a capacitor array comprising a first capacitor coupled to the input node, a floating voltage node coupled to the first capacitor, and a second capacitor coupled between the floating voltage node and the output node. The input stage can also include a reset switch coupled between the floating voltage node and the output node, and a transistor having a gate terminal coupled to the floating voltage node, and coupled between the output node and ground.

20 Claims, 9 Drawing Sheets

COLUMN AMPLIFIER TO SUPPORT DUAL CONVERSION GAIN AND DUAL ANALOG GAIN READOUT

TECHNICAL FIELD

The present disclosure relates generally to image sensors, and in particular but not exclusively, relates to column amplifiers to support dual conversion gain and dual analog gain readout.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
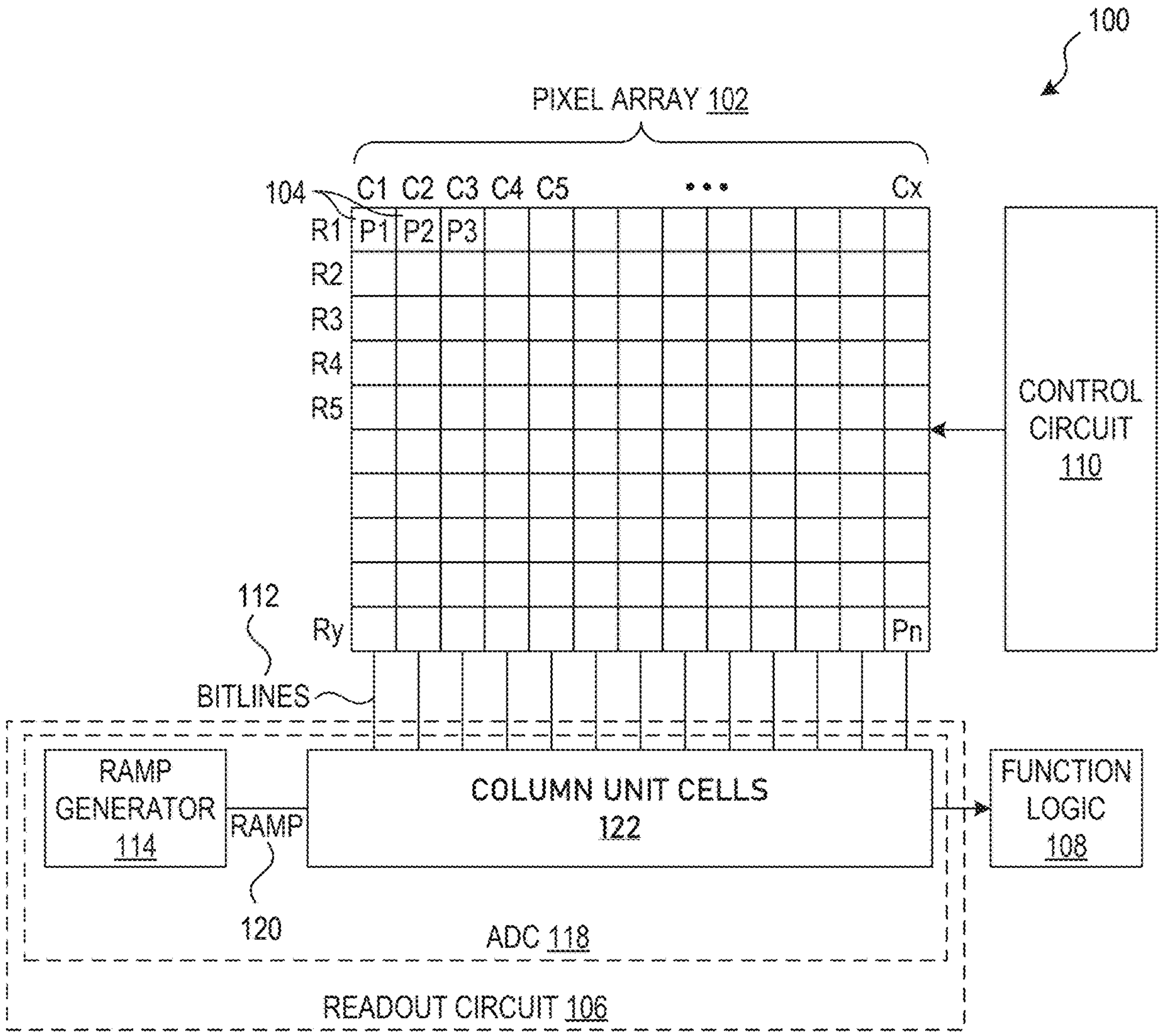
FIG. 1 illustrates one example of an imaging system including a pixel array, configured in accordance with embodiments of the present technology.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

I. Overview

Examples directed to an imaging system with amplifiers to support dual conversion gain (DCG) and dual analog gain (DAG) readout are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to “one example” or “one embodiment” means that a particular feature, structure, or characteristic described in connection with the example is included in at least one example of the present disclosure. Thus, the appearances of the phrases “in one example” or “in one embodiment” in various places throughout this specification are not necessarily all referring to the same example. Furthermore, the particular features, structures, or characteristics may be combined in any suitable manner in one or more examples.

Spatially relative terms, such as “beneath,” “below,” “over,” “under,” “above,” “upper,” “top,” “bottom,” “left,” “right,” “center,” “middle,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as “below” or “beneath” or “under” other elements or features would then be oriented “above” the other elements or features. Thus, the exemplary terms “below” and “under” can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with amplifiers to support DCG and DAG readout are disclosed. DCG and DAG are both readout techniques to increase dynamic range and image quality generally, with DCG switching pixels between two conversion gains and DAG applying two analog amplification levels to the signal. In conventional imaging systems, however, providing both DCG and DAG readout modes can require complicated and large circuitry that may not be suitable for modern imaging system needs.

In various examples of the present technology, a column amplifier for use in an image sensor can include an input node, an output node, and an input stage coupled between the input node and the output node. The input node can be coupled to receive image signals from one or more pixel circuits. The input stage can include a capacitor array comprising a first capacitor coupled to the input node, a floating voltage node coupled to the first capacitor, and a second capacitor coupled between the floating voltage node and the output node. The input stage can also include a reset switch coupled between the floating voltage node and the output node, and a transistor having a gate terminal coupled to the floating voltage node, and coupled between the output node and ground.

To illustrate, FIG. 1 shows one example of an imaging system 100 having a readout circuit 106 including column unit cells 122 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, the readout circuit 106 may be configured to read out the image charge voltage signals through the column bitlines 112. As will be discussed, in the various examples, readout circuit 106 may include an analog-to-digital converter (ADC). As shown in the depicted example, the ADC 118 is coupled to column bitlines 112 and is configured to convert analog signals from column bitlines 112 to digital signals. In various examples, column amplifiers may also be included and may be coupled to column bitlines 112 to amplify the analog signals received from column bitlines 112 for conversion to digital signals by ADC 118. In various examples, the ADC 118 includes a ramp generator 114 and column unit cells 122. The ramp generator 114 has a ramp generator output from which a ramp signal is provided to the column unit cells 122 via a ramp signal line 120. In the example, the digital image data values generated by the column unit cells 122 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
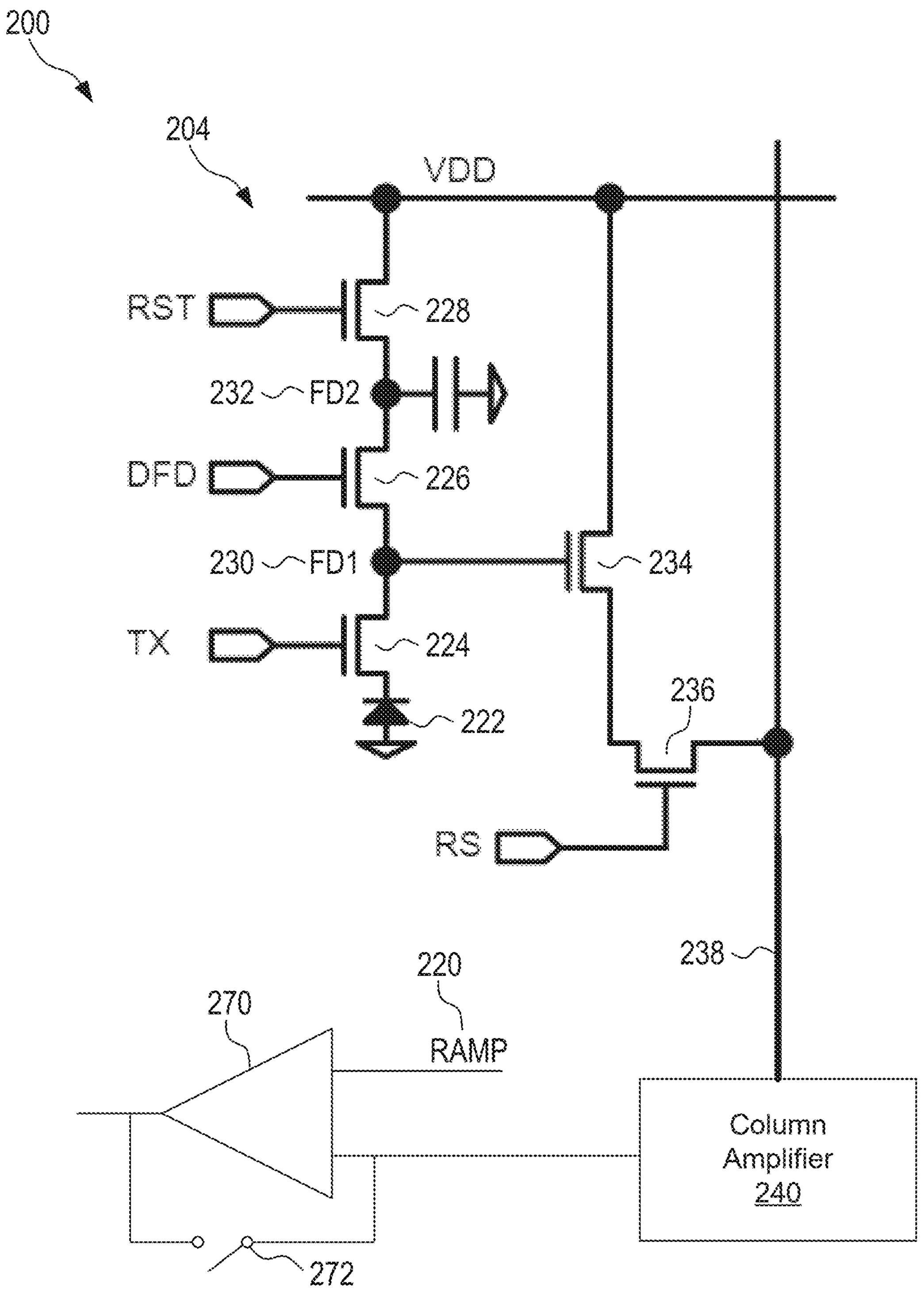
FIG. 2 illustrates another example of an imaging system including a pixel circuit, configured in accordance with embodiments of the present technology.

FIG. 2 illustrates another example of an imaging system 200 configured in accordance with embodiments of the present technology. It is appreciated that the imaging system 200 of FIG. 2 may be an example of the imaging system 100 as shown in FIG. 1, and that similarly named and numbered elements described above are coupled and function similarly below.

In the illustrated example, the imaging system 200 includes a pixel circuit 204, a comparator 270, and a column amplifier 240 coupled therebetween. The pixel circuit 204 can include a photodiode 222, a first floating diffusion FD1 230, and a transfer transistor 224 coupled between the photodiode 222 and FD1 230. The photodiode 222 can be configured to generate image charge in response to incident light, and the transfer transistor 224 can be configured to transfer the generated image charge to FD1 230. The pixel circuit 204 can also include a second floating diffusion FD2 232, a dual floating diffusion (DFD) transistor 226 coupled between FD1 230 and FD2 232, a reset transistor 228 coupled between FD2 232 and a voltage source VDD, a source follower transistor 234 coupled to the voltage source VDD, and a row select transistor 236 coupled between the source follower transistor 234 and a bitline 238. The reset transistor 228 can be configured to reset the pixel circuit 204, and the DFD transistor 226 can be configured to selectively allow image charge to flow between FD1 230 and FD2 232. The source follower transistor 234 can be configured to generate a signal (e.g., an analog signal) based on the image charge at FD1 230, which is coupled to a gate terminal of the source follower transistor 234, and the row select transistor 236 can be configured to selectively transfer the signal from the source follower transistor 234 onto the bitline 238.

The signal on the bitline 238 is received by the column amplifier 240, which can be configured to amplify the signal before outputting the signal to the comparator 270. In some embodiments, the column amplifier 240 is coupled between a column of the pixel array 102 and the ADC 118 (FIG. 1). As discussed in further detail below, during a readout period, the pixel circuit 204 and the column amplifier 240 can be operated together to support either DCG readout or DAG readout. The comparator 270 can include a first input coupled to receive the output of the column amplifier 240 and a second input coupled to receive a ramp signal 220. In some embodiments, the comparator 270 is included in each of the column unit cells 122. The imaging system 200 can further include a comparator switch 272 coupled between the first input and the output of the comparator 270.

Figure 3:
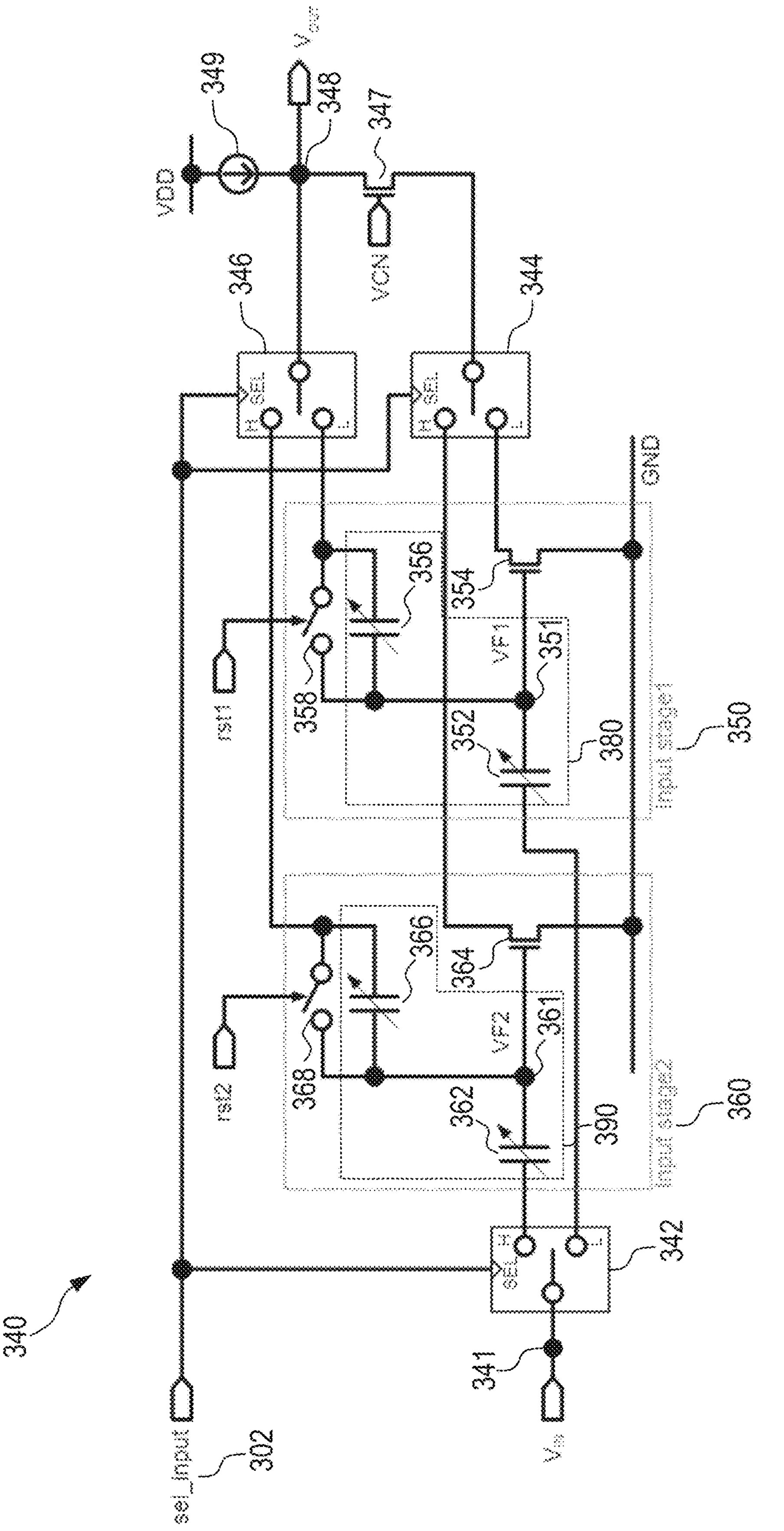
FIG. 3 illustrates a column amplifier, configured in accordance with embodiments of the present technology.

FIG. 3 illustrates a column amplifier 340, configured in accordance with embodiments of the present technology. It is appreciated that the column amplifier 340 of FIG. 3 may be an example of the column amplifier 240 as shown in FIG. 2, and that similarly named and numbered elements described above are coupled and function similarly below.

In the illustrated example, the column amplifier 340 includes an input node 341, an output node 348, a first input stage 350 coupled between the input node 341 and the output node 348, and a second input stage 360 coupled between the input node 341 and the output node 348. The input node 341 can be coupled to receive image signals from one or more pixel circuits (e.g., coupled to the bitline 238 to receive image signals from the pixel circuit 204). The output node 348 can be coupled to output an amplified signal to, for example, a comparator (e.g., the comparator 270 in FIG. 2).

The first input stage 350 can include a first capacitor array 380 comprising a first capacitor 352 coupled to the input node 341, a first floating voltage node VF1 351 coupled to the first capacitor 352, and a second capacitor 356 coupled between VF1 351 and the output node 348. The first input stage 350 can also include a first reset switch 358 coupled between VF1 351 and the output node 348, and a first transistor 354 having a gate terminal coupled to VF1 351, and coupled between the output node 348 and ground GND. The first reset switch 358 can be coupled to the second capacitor 356 in parallel, as shown, and can be controlled by a first reset control signal rst1.

The second input stage 360 can include a second capacitor array 390 comprising a third capacitor 362 coupled to the input node 341, a second floating voltage node VF2 361 coupled to the third capacitor 362, and a fourth capacitor 366 coupled between VF2 361 and the output node 348. The second input stage 360 can also include a second reset switch 368 coupled between VF2 361 and the output node 348, and a second transistor 364 having a gate terminal coupled to VF2 361, and coupled between the output node 348 and ground GND. The second reset switch 368 can be coupled to the fourth capacitor 366 in parallel, as shown, and can be controlled by a second reset control signal rst2.

The column amplifier 340 can further include a first switch 342 coupled to the input node 341, a second switch 344 coupled to the output node 348, a third switch 346 coupled to the output node 348, a cascode transistor 347 coupled between the second switch 344 and the output node 348, and a current source 349 coupled between the output node 348 and a voltage source VDD.

In operation of the column amplifier 340, a switch control signal (sel_input) 302 can be coupled to control the first switch 342, the second switch 344, and the third switch 346 simultaneously. When the switch control signal 302 is low (L), the first switch 342 can be configured to selectively couple the first input stage 350 to the input node 341, and the second switch 344 and the third switch 346 can be configured to selectively couple the first input stage 350 to the output node 348. More specifically, when the switch control signal 302 is low (L), the first switch 342 couples the input node 341 to the first capacitor 352, the second switch 344 couples the output node 348 to the first transistor 354, and the third switch 346 couples the output node 348 to the second capacitor 356 and the first reset switch 358.

When the switch control signal 302 is high (H), the first switch 342 can be configured to selectively couple the second input stage 360 to the input node 341, and the second switch 344 and the third switch 346 can be configured to selectively couple the second input stage 360 to the output node 348. More specifically, when the switch control signal 302 is high (H), the first switch 342 couples the input node 341 to the third capacitor 362, the second switch 344 couples the output node 348 to the second transistor 364, and the third switch 346 couples the output node 348 to the fourth capacitor 366 and the second reset switch 368.

When operating an image sensor to provide DCG, there can be voltage differences between the low conversion gain (LCG) and high conversion gain (HCG) readout modes. Such voltage differences can affect the readout, reducing image quality. By including two input stages and toggling between them via the switch control signal 302, the column amplifier 340 can use different input stages for different gains and thereby support DCG readout. By keeping the first input stage 350 and the second input stage 360 separate for different readout modes, embodiments of the present technology can help avoid voltage differences from affecting the other gain readout, resulting in more accurate DCG readouts.

In some embodiments, the first input stage 350 and the second input stage 360 are arranged in a parallel layout. In some embodiments, the first input stage 350 and the second input stage 360 are stacked, resulting in a smaller pitch in the layout and differences in parasitic capacitance. In some embodiments, the closed loop bandwidth of the column amplifier 340 is set to be higher than that of the bitline that is coupled to the input node 341 such that the settling time of the image sensor during a readout period is determined by the bitline, and not by the column amplifier 340.

In some embodiments, the layout of the circuit elements is configured such that differences between the first input stage 350 and the second input stage 360 are minimal. For example, the first input stage 350 and the second input stage 360 can be arranged in parallel. In another example, the first input stage 350 and the second input stage 360 can be stacked and nested to minimize differences in their loading capacitance on the output node 348. As a non-limiting example, the circuit components can be arranged in a nested layout according to the following order: VIN, the first switch 342, the third capacitor 362, the first capacitor 352, the fourth capacitor 366, the second capacitor 356, the third switch 346, the second transistor 364, the first transistor 354, the second switch 344, and $V_{OUT}$.

In some embodiments, the layout of the circuit elements is configured such that differences between the first input stage 350 and the second input stage 360 are appreciable. For example, the first input stage 350 and the second input stage 360 can be stacked such that the distance between the third switch 346 and the first capacitor array 380 is appreciably different from the distance between the third switch 346 and the second capacitor array 390. In such examples, the second input stage 360 can have a larger loading, especially on the output node 348, than the first input stage 350. The closed loop bandwidth and the closed loop gain of an input stage can have an inversely proportional relationship. Therefore, when using different gain settings during DCG readouts, the first input stage 350 can be used for HCG readout and the second input stage 360 can be used for LCG readout. Conversely, when using the same or similar gain settings during DCG readouts, the first input stage 350 can be used for LCG readout and the second input stage 360 can be used for HCG readout, since the bitline bandwidth during LCG can be higher than during HCG.

Figure 4:
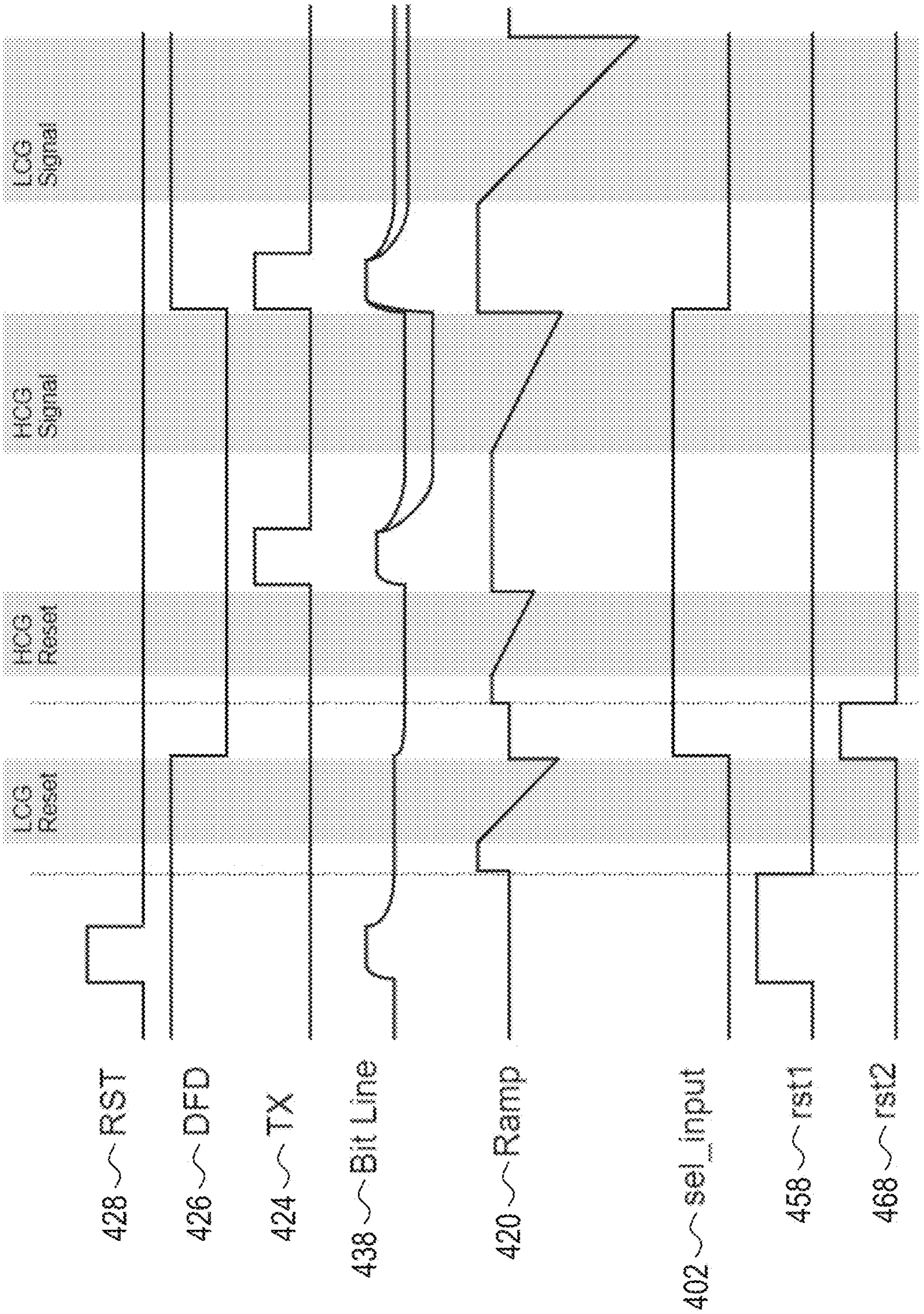
FIG. 4 illustrates a timing diagram for operating a column amplifier in a dual conversion gain mode in accordance with embodiments of the present technology.

FIG. 4 illustrates a timing diagram for operating a column amplifier in a DCG readout mode in accordance with embodiments of the present technology. It is appreciated that the timing diagram of FIG. 4 can be an example timing diagram of the column amplifier 340 of FIG. 3, and that similarly named and numbered elements described above are coupled and function similarly below.

As shown, a switch control signal sel_input 402 is kept at a low level such that a first input stage (e.g., the first input stage 350) of a column amplifier (e.g., the column amplifier 340) is connected to a pixel circuit (e.g., the pixel circuit 204). A pixel reset signal RST 428 and a first input stage reset signal rst1 458 are pulsed to reset the pixel circuit and the first input stage, respectively. In particular, rst1 458 is turned off after RST 428 is turned off such that the bitline signal 438 can settle before the first floating voltage node (e.g., VF1 351) is reset.

During LCG reset signal readout, a dual floating diffusion transistor signal DFD 426 is kept on and a ramp signal 420 is provided, capturing noise from both floating diffusions (e.g., FD1 230 and FD2 232) in the pixel circuit. Afterwards, DFD 426 is turned off, sel_input 402 is turned on to couple a second input stage (e.g., the second input stage 360) to the pixel circuit, and a second input stage reset signal rst2 468 is turned on to reset the second floating voltage node (e.g., VF2 361). During HCG reset signal readout, the ramp signal 420 is provided, capturing noise from the first floating diffusion (e.g., FD1 230) since DFD 426 is turned off.

Prior to HCG image signal readout, a transfer transistor signal TX 424 is pulsed to transfer the image charge from the photodiode (e.g., the photodiode 222) to the first floating diffusion. During HCG image signal readout, sel_input 402 is kept high such that the second input stage is used for both HCG reset and image signal readouts, and the ramp signal 420 is provided to capture the HCG image signal. Afterwards, sel_input 402 is turned low such that the first input stage is used for both LCG reset and image signal readouts. DFD 426 is turned back on, and TX 424 is pulsed again to transfer the image charge to both floating diffusions. During LCG image signal readout, the ramp signal 420 is provided to capture the LCG image signal.

Figure 5:
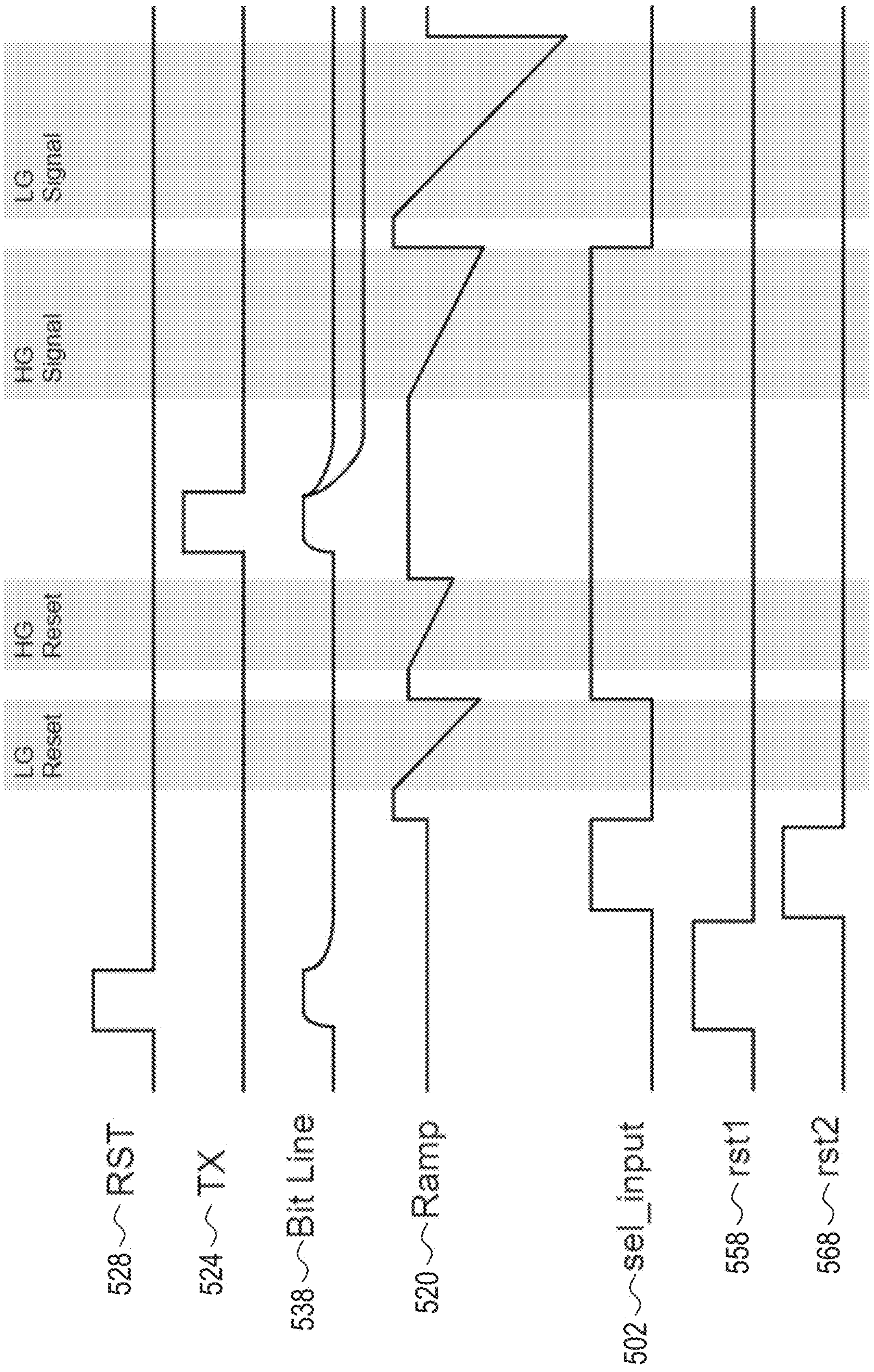
FIG. 5 illustrates a timing diagram for operating a column amplifier in a dual analog gain mode in accordance with embodiments of the present technology.

FIG. 5 illustrates a timing diagram for operating a column amplifier in a DAG readout mode in accordance with embodiments of the present technology. It is appreciated that the timing diagram of FIG. 5 can be an example timing diagram of the column amplifier 340 of FIG. 3, and that similarly named and numbered elements described above are coupled and function similarly below.

As shown, a pixel reset signal RST 528 is initially pulsed while a switch control signal sel_input 502 is kept at a low level and a first input stage reset signal rst1 558 is pulsed such that the bitline signal 538 can settle before the first floating voltage node of a first input stage is reset. As rst1 558 is turned off, sel_input 502 and a second input stage reset signal rst2 568 are turned on to reset the second floating voltage node of the second input stage. This is in contrast to the DCG readout timing diagram of FIG. 4 in which the second input stage is reset after the LCG reset signal readout. In DAG readout, the signal received from the pixel circuit is the same between low gain and high gain, so the first and second floating voltage nodes of the first and second input stages, respectively, can be reset using the common signal. However, in some embodiments, rst2 568 can be pulsed after the low gain (LG) reset signal readout.

During LG reset signal readout, sel_input 502 is brought back to the low level such that the first input stage is coupled to the pixel circuit, and a ramp signal 520 is provided to capture noise in the pixel circuit. Afterwards, sel_input 502 is brought back to the high level such that the second input stage is coupled to the pixel circuit. During high gain (HG) reset signal readout, the ramp signal 520 is provided to capture noise from the pixel circuit.

Afterwards, a transfer transistor signal TX 524 is pulsed to transfer the image charge from the photodiode to the floating diffusion. During HG image signal readout, the ramp signal 520 is provided to capture the HG image signal. Afterwards, sel_input 502 is brought back to the low level such that the first input stage is coupled to the pixel circuit. Notably, TX 524 is not pulsed again because, as aforementioned, the signal received from the pixel circuit does not change between LG and HG. During LG image signal readout, the ramp signal 520 is provided to capture the LG image signal.

Figure 6:
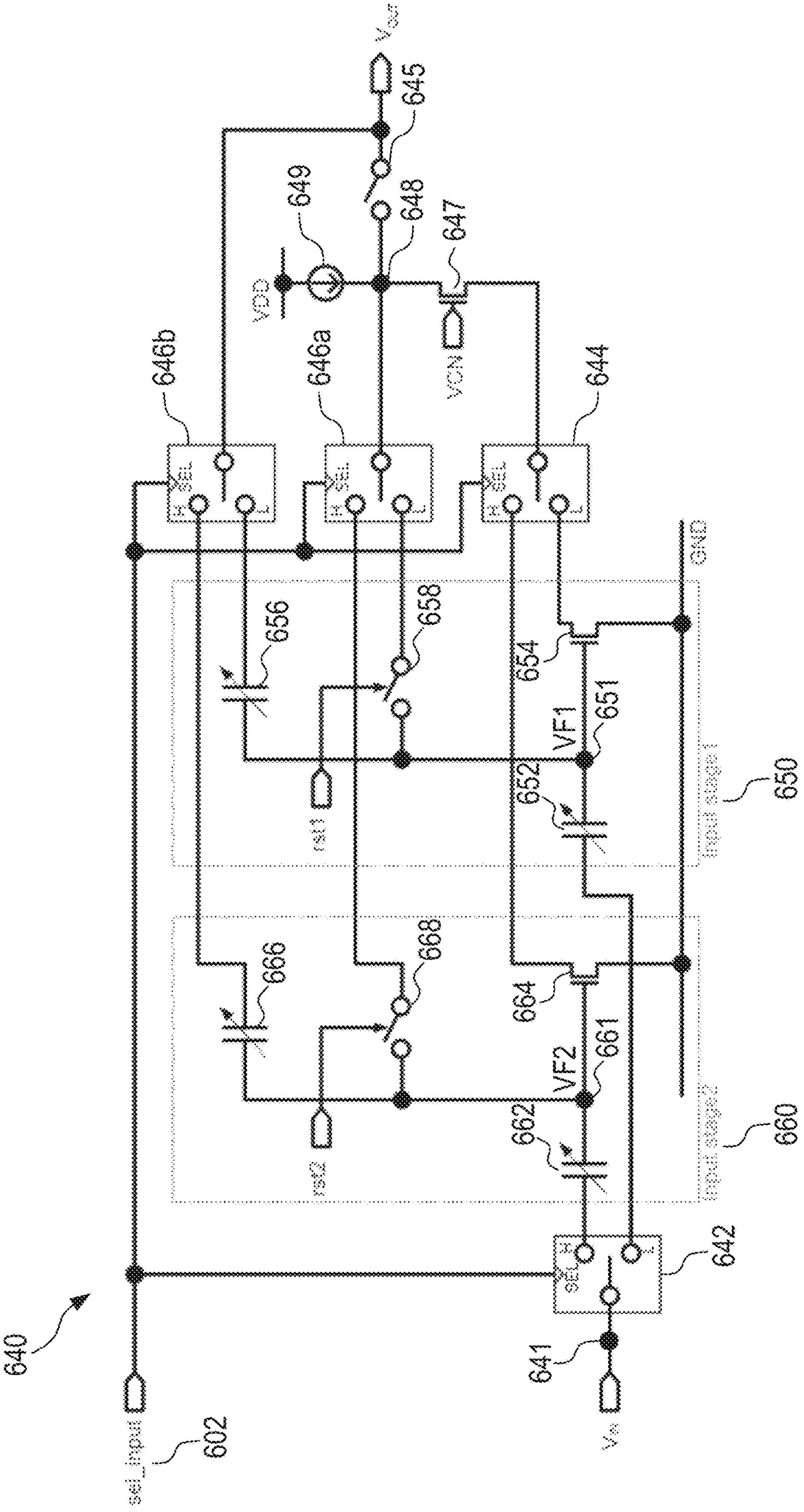
FIG. 6 illustrates another column amplifier, configured in accordance with embodiments of the present technology.

FIG. 6 illustrates a column amplifier 640 configured in accordance with embodiments of the present technology. It is appreciated that the column amplifier 640 of FIG. 6 may be an example of the column amplifier 240 as shown in FIG. 2, and that similarly named and numbered elements described above are coupled and function similarly below.

In the illustrated example, the column amplifier 640 includes an input node 641, an output node 648, a first input stage 650 coupled between the input node 641 and the output node 648, and a second input stage 660 coupled between the input node 641 and the output node 648. The input node 641 can be coupled to receive image signals from one or more pixel circuits (e.g., coupled to the bitline 238 to receive image signals from the pixel circuit 204). The output node 648 can be coupled to output an amplified signal to, for example, a comparator (e.g., the comparator 270 in FIG. 2).

The first input stage 650 can include a first capacitor array comprising a first capacitor 652 coupled to the input node 641, a first floating voltage node VF1 651 coupled to the first capacitor 652, and a second capacitor 656 coupled between VF1 651 and the output node 648. The first input stage 650 can also include a first reset switch 658 coupled between VF1 651 and the output node 648, and a first transistor 654 having a gate terminal coupled to VF1 651, and coupled between the output node 648 and ground GND. The first reset switch 658 can be controlled by a first reset control signal rst1.

The second input stage 660 can include a second capacitor array comprising a third capacitor 662 coupled to the input node 641, a second floating voltage node VF2 661 coupled to the third capacitor 662, and a fourth capacitor 666 coupled between VF2 661 and the output node 648. The second input stage 660 can also include a second reset switch 668 coupled between VF2 661 and the output node 648, and a second transistor 664 having a gate terminal coupled to VF2 661, and coupled between the output node 648 and ground GND. The second reset switch 668 can be controlled by a second reset control signal rst2.

The column amplifier 640 can further include a first switch 642 coupled to the input node 641, a second switch 644 coupled to the output node 648, a third switch 646*a* coupled to the output node 648, a fourth switch 646*b* coupled to the output node 648, a cascode transistor 647 coupled between the second switch 644 and the output node 648, a current source 649 coupled between the output node 648 and a voltage source VDD, and an amplifier output switch 645 coupled between the fourth switch 646*b* and the output node 648.

In operation of the column amplifier 640, a switch control signal sel_input 602 can be coupled to control the first switch 642, the second switch 644, the third switch 646*a*, and the fourth switch 646_b_ simultaneously. When sel_input 602 is low (L), the first switch 642 can be configured to selectively couple the first input stage 650 to the input node 641, and the second switch 644, the third switch 646_a_, and the fourth switch 646_b_ can be configured to selectively couple the first input stage 650 to the output node 648. More specifically, when sel_input 602 is low (L), the first switch 642 couples the input node 641 to the first capacitor 652, the second switch 644 couples the output node 648 to the first transistor 654, the third switch 646_a_ couples the output node 648 to the first reset switch 658, and the fourth switch 646_b_ couples the output node 648 to the second capacitor 656.

When sel_input 602 is high (H), the first switch 642 can be configured to selectively couple the second input stage 660 to the input node 641, and the second switch 644, the third switch 646_a_, and the fourth switch 646_b_ can be configured to selectively couple the second input stage 660 to the output node 648. More specifically, when sel_input 602 is high (H), the first switch 642 couples the input node 641 to the third capacitor 662, the second switch 644 couples the output node 648 to the second transistor 664, the third switch 646_a_ couples the output node 648 to the second reset switch 668, and the fourth switch 646_b_ couples the output node 648 to the fourth capacitor 666.

In operation, the column amplifier 640 can function similarly to the column amplifier 340 shown in FIG. 3. For example, the column amplifier 640 can toggle sel_input 602 to couple either the first input stage 650 or the second input stage 660 between the input node 641 and the output node 648. By having dedicated switches for the first and second reset switches 658, 668 (e.g., the third switch 646_a_) and the second and fourth capacitors 656, 666 (e.g., the fourth switch 646_b_), unlike the column amplifier 340, select components of the column amplifier 640 can be reset (e.g., preset) using the output of a comparator. For example, momentarily referring back to FIG. 2, the comparator switch 272 selectively couples the first input and the output of the comparator 270.

During a reset (e.g., preset) operation, the second and/or fourth capacitor 656, 666 can be pre-charged by deactivating the amplifier output switch 645 and activating the first and/or second reset switches 658, 668. The voltage at a first plate of the second and/or fourth capacitor 656, 666 (e.g., coupled to VF1 651 and/or VF2 661) is thus brought to the voltage level at the output node 648, and the voltage at a second plate (e.g., coupled to the fourth switch 646_b_) is thus brought to the voltage level at the output of the column amplifier 640 (e.g., $V_{OUT}$). Therefore, the second capacitor 656 or the fourth capacitor 666 can be reset (e.g., preset) using the output of the comparator 270, and then they can act as feedback capacitors. This enables an input capacitance of the comparator 270 to be removed. In other words, an input capacitance for the comparator 270 is not required when operating the comparator 270 with the column amplifier 640. After the reset (e.g., preset) operation, the column amplifier 640 can proceed with normal operations by deactivating the first and/or second reset switches 658, 668 and activating the amplifier output switch 645.

Figure 7:
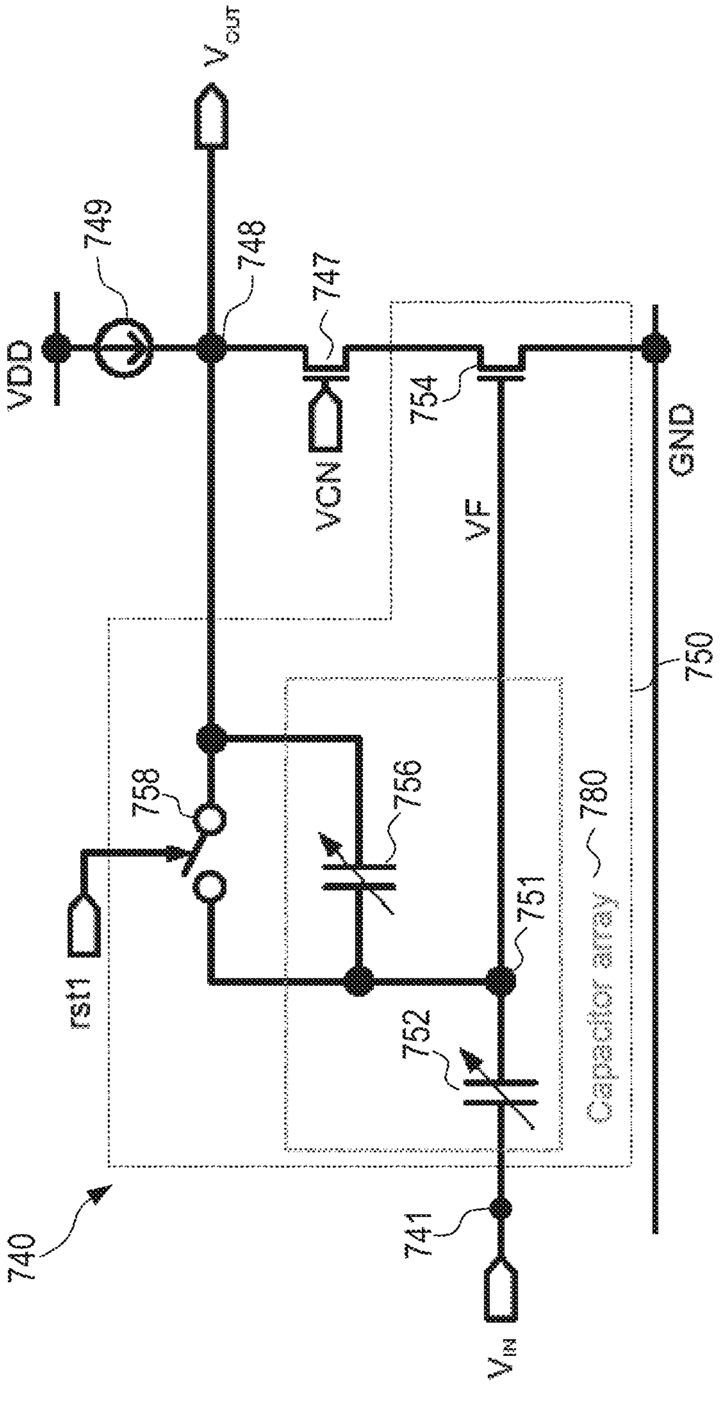
FIG. 7 illustrates yet another column amplifier, configured in accordance with embodiments of the present technology.

FIG. 7 illustrates a column amplifier 740 configured in accordance with embodiments of the present technology. It is appreciated that the column amplifier 740 of FIG. 7 may be an example of the column amplifier 240 as shown in FIG. 2, and that similarly named and numbered elements described above are coupled and function similarly below.

In the illustrated example, the column amplifier 740 includes an input node 741, an output node 748, and an input stage 750 coupled between the input node 741 and the output node 748. The input node 741 can be coupled to receive image signals from one or more pixel circuits (e.g., coupled to the bitline 238 to receive image signals from the pixel circuit 204). The output node 748 can be coupled to output an amplified signal to, for example, a comparator (e.g., the comparator 270 in FIG. 2).

The input stage 750 can include a capacitor array 780 comprising a first capacitor 752 coupled to the input node 741, a floating voltage node VF 751 coupled to the first capacitor 752, and a second capacitor 756 coupled between VF 751 and the output node 748. The first input stage 650 can also include a reset switch 758 coupled between VF 751 and the output node 748, and a transistor 754 having a gate terminal coupled to VF 751, and coupled between the output node 748 and ground GND. The reset switch 758 can be coupled to the second capacitor 756 in parallel, and can be controlled by a reset control signal rst1. By having a single input stage, the column amplifier 740 can support DAG readout mode.

The column amplifier 740 can further include a cascode transistor 747 coupled between the transistor 754 and the output node 748, and a current source 749 coupled between the output node 748 and a voltage source VDD. As discussed further herein, the capacitor array 780 can be configured to provide varying gain levels.

Figure 8:
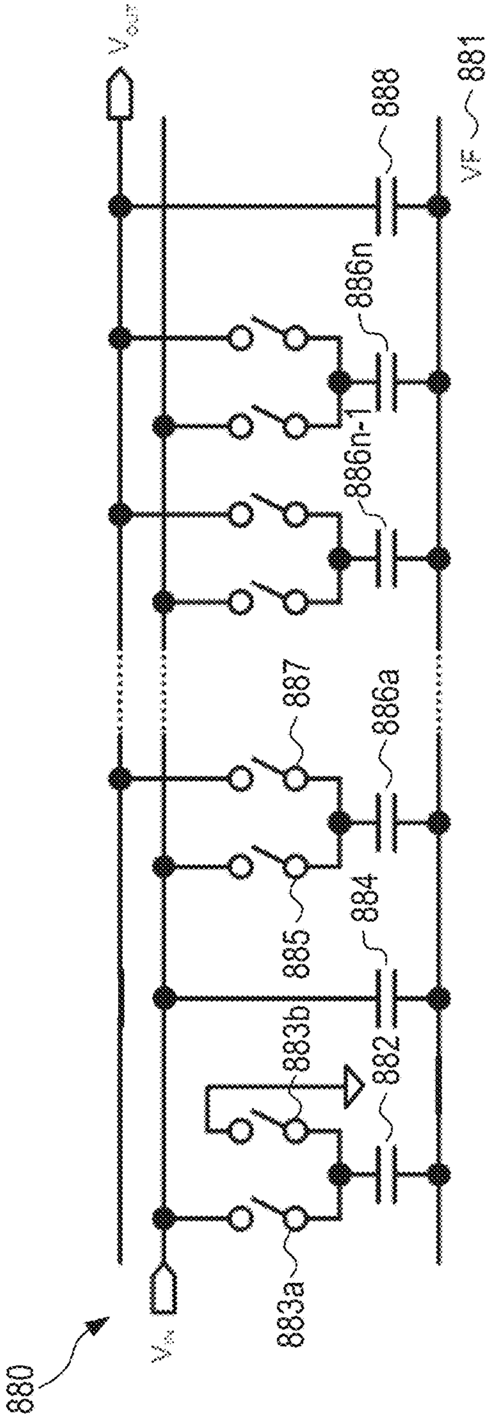
FIG. 8 illustrates a capacitor array that can be included in a column amplifier, configured in accordance with embodiments of the present technology.

FIG. 8 illustrates a capacitor array 880 configured in accordance with embodiments of the present technology. It is appreciated that the capacitor array 880 of FIG. 8 may be an example of the capacitor array 780 as shown in FIG. 7, and that similarly named and numbered elements described above are coupled and function similarly below.

In the illustrated example, the capacitor array 880 includes a grounding capacitor 882, a first capacitor 884, a second capacitor 888, and one or more floating capacitors 886_a-n_. The first capacitor 884 remains coupled between the input $V_{IN}$ and a floating voltage node VF 881, and can be an example of the first capacitor 752. The second capacitor 888 remains coupled between the output $V_{OUT}$ and VF 881, and can be an example of the second capacitor 756. The grounding capacitor 882 can be selectively coupled to the input $V_{IN}$ via switch 883_a_, selectively coupled to ground via switch 883_b_, or neither in which case the grounding capacitor 882 is "floating."

Each of the floating capacitors 886_a-n_ can be selectively coupled to the input $V_{IN}$ via switch 885, selectively coupled to the output $V_{OUT}$ via switch 887, or neither in which case the floating capacitor 886 would be "floating." The switches 885, 887 can be controlled to configure the capacitor array 880, and thus the column amplifier that the capacitor array 880 is part of, to provide varying gain levels. Table 1 below provides example gain configurations in which the capacitor array 880 includes a total of 10 capacitors. For example, the capacitor array 880 can include the grounding capacitor 882, the first capacitor 884, the second capacitor 888, and seven floating capacitors 886. In another example, the grounding capacitor 882 can be omitted such that the capacitor array 880 includes the first capacitor 884, the second capacitor 888, and eight floating capacitors 886.

TABLE 1

| | Gain | | | |
|---|---|---|---|---|
| | LG = 1x | HG = 4x | LG = 2x | HG = 8x |
| Number of Capacitors Coupled to $V_{IN}$ | 2 | 8 | 2 | 8 |

TABLE 1-continued

| | Gain | | | |
|---|---|---|---|---|
| | LG = 1x | HG = 4x | LG = 2x | HG = 8x |
| Number of Capacitors Coupled to $V_{OUT}$ | 2 | 2 | 1 | 1 |
| Number of "Floating" Capacitors | 6 | 0 | 7 | 1 |

Because the first capacitor 884 remains coupled to $V_{IN}$ and the second capacitor 888 remains coupled to $V_{OUT}$, the grounding capacitor 882 and/or the floating capacitors 886 can be configured, via the switches 883*a*, 883*b*, 885, 887, to be coupled to $V_{IN}$, coupled to $V_{OUT}$, or "floating." As one example, to achieve a LG of 2×, the grounding capacitor 882 can be coupled to $V_{IN}$ via the switch 883*a* and all seven of the floating capacitors 886 can be configured to be "floating." Alternatively, in embodiments omitting the grounding capacitor 882 and including eight floating capacitors 886, one of the floating capacitors 886 can be coupled to $V_{IN}$ via the corresponding switch 885, and the remaining seven of the floating capacitors 886 can be configured to be "floating."

Table 2 below provides example gain configurations in which the capacitor array 880 includes a total of nine capacitors. For example, the capacitor array 880 can include the grounding capacitor 882, the first capacitor 884, the second capacitor 888, and six floating capacitors 886. In another example, the grounding capacitor 882 can be omitted such that the capacitor array 880 includes the first capacitor 884, the second capacitor 888, and seven floating capacitors 886.

TABLE 2

| | Gain | | | |
|---|---|---|---|---|
| | LG = 1x | HG = 3.5x | LG = 2x | HG = 8x |
| Number of Capacitors Coupled to $V_{IN}$ | 2 | 7 | 2 | 8 |
| Number of Capacitors Coupled to $V_{OUT}$ | 2 | 2 | 1 | 1 |
| Number of "Floating" Capacitors | 5 | 0 | 6 | 0 |

As one example, to achieve a LG of 1×, the grounding capacitor 882 can be coupled to $V_{IN}$ via the switch 883*a*, one of the floating capacitors 886 can be coupled to $V_{OUT}$ via the switch 887, and the remaining five of the floating capacitors 886 can be configured to be "floating." Alternatively, in embodiments omitting the grounding capacitor 882 and including seven floating capacitors 886, one of the floating capacitors 886 can be coupled to $V_{IN}$ via the corresponding switch 885, another one of the floating capacitors 886 can be coupled to $V_{OUT}$ via the corresponding switch 887, and the remaining five of the floating capacitors 886 can be configured to be "floating."

Referring to the examples in Tables 1 and 2 together, configuring at least some of capacitors to be "floating" (primarily for LG) and thus disconnected from both $V_{IN}$ and $V_{OUT}$ can prevent change in the output voltage when switching gain. Notably, in each of the examples in Tables 1 and 2, the number of capacitors coupled to $V_{OUT}$ remains constant when reconfiguring the capacitor array 880 from providing LG to providing HG (e.g., from LG=1× to HG=4×, from LG=1× to HG=3.5×, from LG=2× to HG=4×). Accordingly, the voltage supplied to the capacitors can be kept constant between LG and HG, thereby keeping the output voltage substantially constant as well.

Table 3 below provides different example gain configurations in which the capacitor array 880 includes a total of 10 capacitors and relies on selectively connecting to ground. Namely, the capacitor array 880 includes the grounding capacitor 882, the first capacitor 884, the second capacitor 888, and seven floating capacitors 886.

TABLE 3

| | Gain | | | |
|---|---|---|---|---|
| | 1x | 2x | 4x | 8x |
| Number of Capacitors Coupled to $V_{IN}$ | 5 | 6 | 8 | 8 |
| Number of Capacitors Coupled to $V_{OUT}$ | 5 | 3 | 2 | 1 |
| Number of Capacitors Coupled to GND | 0 | 1 | 0 | 1 |

As one example, to achieve a gain of 8×, the grounding capacitor 882 can be coupled to ground via the switch 883*b*, and the seven floating capacitors 886 can be coupled to $V_{IN}$. The first capacitor 884 and the second capacitor 888 can remain coupled to $V_{IN}$ and $V_{OUT}$, respectively.

Table 4 below provides different example gain configurations in which the capacitor array 880 includes a total of nine capacitors and relies on selectively connecting to ground. Namely, the capacitor array 880 includes the grounding capacitor 882, the first capacitor 884, the second capacitor 888, and six floating capacitors 886.

TABLE 4

| | Gain | | | | |
|---|---|---|---|---|---|
| | 1x | 2x | 3.5x | 7x | 8x |
| Number of Capacitors Coupled to $V_{IN}$ | 4 | 6 | 7 | 7 | 8 |
| Number of Capacitors Coupled to $V_{OUT}$ | 4 | 3 | 2 | 1 | 1 |
| Number of Capacitors Coupled to GND | 1 | 0 | 0 | 1 | 0 |

As one example, to achieve a gain of 3.5×, the grounding capacitor 882 can be coupled to $V_{IN}$ via the switch 883*a*, five floating capacitors 886 can be coupled to $V_{IN}$ via the corresponding switches 885, and the remaining one floating capacitor 886 can be coupled to $V_{OUT}$ via the corresponding switch 887. The first capacitor 884 and the second capacitor 888 can remain coupled to $V_{IN}$ and $V_{OUT}$, respectively.

Referring to the examples in Tables 3 and 4 together, configuring the grounding capacitor 882 to be selectively coupled to ground or $V_{IN}$ is another method of achieving varying gain levels without having "floating" capacitors. However, in DAG readout mode, it can be difficult to change the gain between LG and HG based on the examples in Tables 3 and 4 due to different voltages between $V_{IN}$ and $V_{OUT}$, resulting in large offsets after switching gains. As discussed above with reference to Tables 1 and 2, configuring some of the capacitors to be "floating" can prevent such offsets in the output voltage when switching gains.

Figure 9:
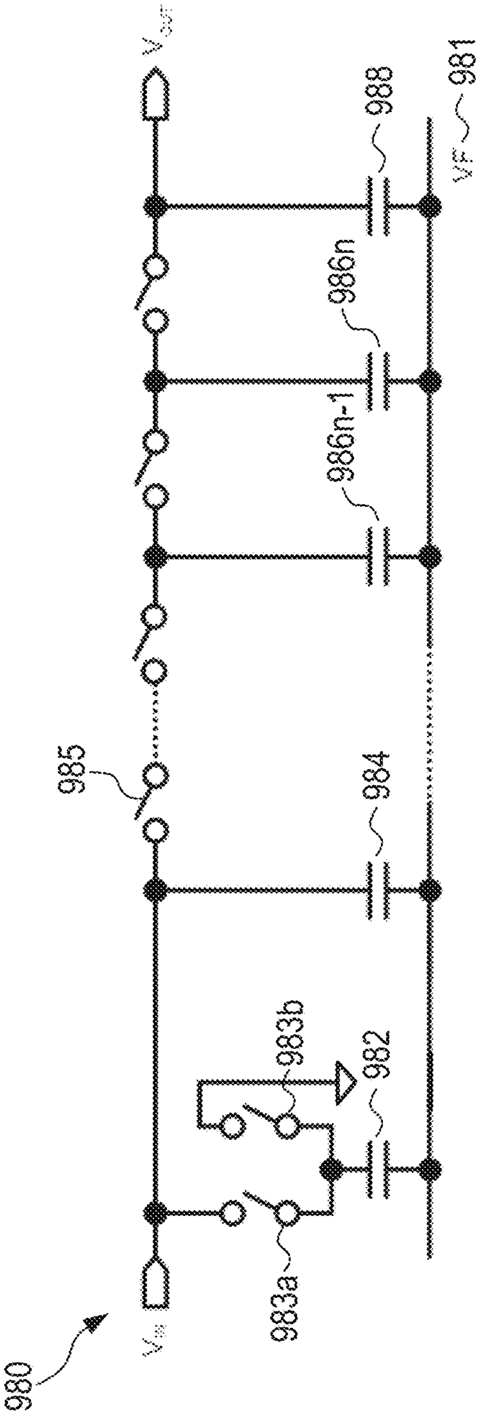
FIG. 9 illustrates another capacitor array that can be included in a column amplifier, configured in accordance with embodiments of the present technology.

FIG. 9 illustrates a capacitor array 980 configured in accordance with embodiments of the present technology. It is appreciated that the capacitor array 980 of FIG. 9 may be an example of the capacitor array 780 as shown in FIG. 7, and that similarly named and numbered elements described above are coupled and function similarly below.

In the illustrated example, the capacitor array 980 includes a grounding capacitor 982, a first capacitor 984, a second capacitor 988, and one or more grouping capacitors 986*a-n*. The first capacitor 984 remains coupled between the input $V_{IN}$ and a floating voltage node VF 981, and can be an example of the first capacitor 752. The second capacitor 988 remains coupled between the output $V_{OUT}$ and VF 981, and can be an example of the second capacitor 756. The grounding capacitor 982 can be selectively coupled to the input $V_{IN}$ via switch 83*a*, selectively coupled to ground via switch 983*b*, or neither in which case the grounding capacitor 982 is "floating." Each grouping capacitor 986 can be selectively coupled to an adjacent grouping capacitor 986 via switches 985. The number of switches 985 can be the number of grouping capacitors 986 plus one. The switches 985 can also selectively couple individual ones of the grouping capacitors 986 to the input $V_{IN}$, the output $V_{OUT}$, or neither in which case the grouping capacitor 986 is "floating."

It is appreciated that the capacitor array 980 can be configured to provide the varying gain levels as provided in the examples in Tables 1-4 above. One or more grouping capacitors 986 can be configured to be "floating" by turning off the two switches 985 directly coupled to each of those grouping capacitors 986. A certain number of consecutive switches 985 beginning from the first capacitor 984 (e.g., going left to right) can be turned on such that the grouping capacitors 986 in between those turned on switches 985 are coupled to $V_{IN}$. Conversely, a certain number of consecutive switches 985 beginning from the second capacitor 988 (e.g., going right to left) can be turned on such that the grouping capacitors 986 in between those turned on switches 985 are coupled to $V_{OUT}$. Therefore, by selectively turning on and off certain switches 985, the grouping capacitors 986 can be "grouped" into a first group that is coupled to $V_{IN}$, a second group that is coupled to $V_{OUT}$, and/or a third group that is "floating."

As one example, the capacitor array 980 can include a total of 10 capacitors (the grounding capacitor 982, the first capacitor 984, the second capacitor 988, and seven grouping capacitors 986) and can provide a gain level of 8× (see Table 1 above). The grounding capacitor 982 can be coupled to $V_{IN}$ via the switch 983*a*, and the first capacitor 984 and the second capacitor 988 can remain coupled to $V_{IN}$ and $V_{OUT}$, respectively. With eight switches 985, the seventh and eight switches counting from the left can be turned off while the remaining six switches 985 are turned on. Thus, six of the grouping capacitors 986 are coupled to $V_{IN}$ while the remaining one of the grouping capacitors 986, coupled to the node between the seventh and eighth switches 985 that are turned off, is "floating."

As another example, the capacitor array 980 can include a total of nine capacitors (the grounding capacitor 982, the first capacitor 984, the second capacitor 988, and six grouping capacitors 986) and can provide a gain level of 1× (see Table 2 above). The grounding capacitor 982 can be coupled to $V_{IN}$ via the switch 983*a*, and the first capacitor 984 and the second capacitor 988 can remain coupled to $V_{IN}$ and $V_{OUT}$, respectively. With seven switches 985, the seventh switch counting from the left can be turned on while the remaining six switches 985 are turned off. Thus, one of the grouping capacitors 986 is coupled to $V_{OUT}$ while the remaining five of the grouping capacitors 986, each coupled to a node between switches 985 that are turned off, are "floating."

Figure 10:
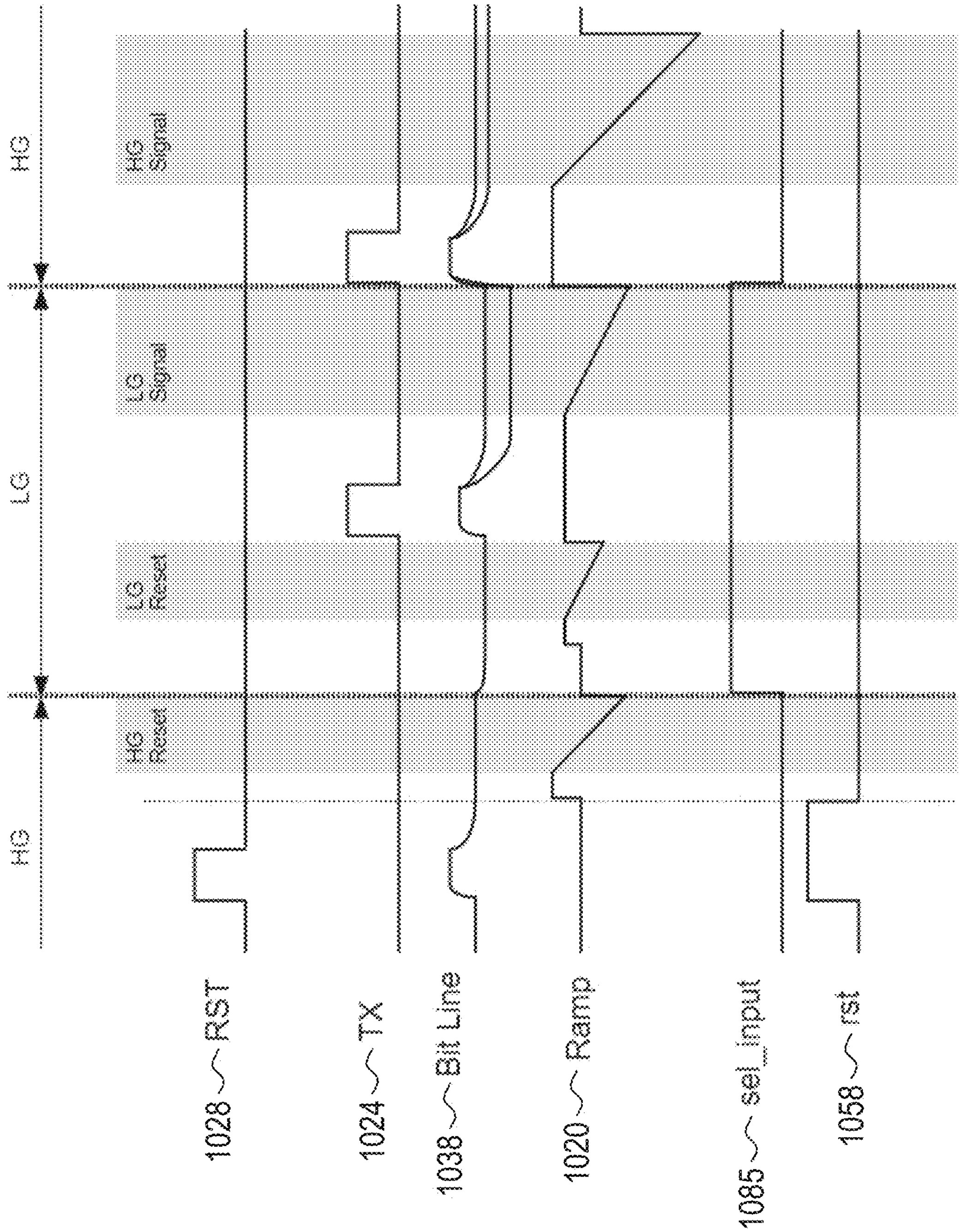
FIG. 10 illustrates a timing diagram for operating a column amplifier in a dual analog gain mode in accordance with embodiments of the present technology.

FIG. 10 illustrates a timing diagram for operating a column amplifier in a DAG readout mode in accordance with embodiments of the present technology. It is appreciated that the timing diagram of FIG. 10 can be an example timing diagram of the column amplifier 740 of FIG. 7, and that similarly named and numbered elements described above are coupled and function similarly below.

As shown, a pixel reset signal RST 1028 is initially pulsed while an input stage reset signal rst 1058 is pulsed such that the bitline signal 1038 can settle before the floating voltage node of an input stage is reset. A switch control signal sel_input 1085 can be configured to selectively activate switches included in a capacitor array (e.g., the switches 883*a*, 883*b*, 885, 887, 983*a*, 983*b*, 985), and is initially kept at a low level, as shown.

During HG reset signal readout, sel_input 1085 is kept at the low level while a ramp signal 1020 is provided to capture noise in the pixel circuit. Afterwards, sel_input 1085 is raised to a high level to selectively activate or deactivate certain switches in the capacitor array. As discussed above with reference to FIGS. 8 and 9, the switches coupled to the capacitors can be controlled to change the gain setting provided by the column amplifier. Thus, sel_input 1085 can be turned on to configure the switches according to any one of the examples in Tables 1-4 above, or other examples not necessarily shown herein), to achieve the desired gain shift. During LG reset signal readout, the ramp signal 1020 is provided to capture noise from the pixel circuit.

Afterwards, a transfer transistor signal TX 1024 is pulsed to transfer the image charge from the photodiode to the floating diffusion. During LG image signal readout, the ramp signal 1020 is provided to capture the LG image signal. Afterwards, sel_input 1085 is brought back to the low level, reconfiguring the capacitor array to provide the high gain setting, and TX 1024 is pulsed again. During HG image signal readout, the ramp signal 1020 is provided to capture the HG image signal.

Notably, because some of the capacitors can be "floating" when providing LG as discussed above with reference to Tables 1 and 2, the output voltage can be changed when switching from HG to LG (e.g., switching from reading out HG image signals to reading out LG image signals). Therefore, to avoid such a transition, the LG reset and image signal readouts are performed consecutively (e.g., in the middle of the timing diagram), as shown in FIG. 10.

It is appreciated that the FIGS. 1-10 merely illustrate example embodiments, and that modifications are within the scope of the present technology. For example, the column amplifiers 340, 640, 740 illustrated in FIGS. 3, 6, and 7, respectively, may omit certain components (e.g., the cascode transistors) and/or include additional/alternative components. As another example, the readout periods (e.g., LG reset signal readout, HG image signal readout) shown in the timing diagrams illustrated in FIGS. 4, 5, and 10 can be performed in a different order.

The above description of illustrated examples of the disclosure, including the tables above and what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

I claim:

1. A column amplifier for use in an image sensor, comprising:
- an input node coupled to receive image signals from one or more pixel circuits;
- an output node; and
- an input stage coupled between the input node and the output node, wherein the input stage comprises:
  - a capacitor array including a first capacitor coupled to the input node, a floating voltage node coupled to the first capacitor, and a second capacitor coupled between the floating voltage node and the output node,
  - a reset switch coupled between the floating voltage node and the output node, and
  - a transistor having a gate terminal coupled to the floating voltage node, and coupled between the output node and ground.

2. The column amplifier of claim 1, further comprising:
- a second input stage coupled between the input node and the output node, wherein the second input stage comprises:
  - a second capacitor array including a third capacitor coupled to the input node, a second floating voltage node coupled to the third capacitor, and a fourth capacitor coupled between the second floating voltage node and the output node,
  - a second reset switch coupled between the second floating voltage node and the output node, and
  - a second transistor having a gate terminal coupled to the second floating voltage node, and coupled between the output node and ground;
- a first switch coupled to the input node, the input stage, and the second input stage, wherein the first switch is configured to selectively couple the input node to either the input stage or the second input stage; and
- a second switch coupled to the input stage, the second input stage, and the output node, wherein the second switch is configured to selectively couple the transistor or the second transistor to the output node.

3. The column amplifier of claim 2, further comprising a third switch coupled to the input stage, the second input stage, and the output node, wherein the third switch is configured to selectively couple (i) the second capacitor and the reset switch or (ii) the fourth capacitor and the second reset switch to the output node.

4. The column amplifier of claim 2, further comprising:
- a third switch coupled to the input stage, the second input stage, and the output node, wherein the third switch is configured to selectively couple the second capacitor or the fourth capacitor to the output node; and
- a fourth switch coupled to the input stage, the second input stage, and the output node, wherein the fourth switch is configured to selectively couple the reset switch or the second reset switch to the output node.

5. The column amplifier of claim 1, wherein the capacitor array further comprises:
- a plurality of floating capacitors coupled to the floating voltage node;
- a plurality of first switches, each configured to selectively couple a corresponding one of the plurality of floating capacitors to the input node; and
- a plurality of second switches, each configured to selectively couple a corresponding one of the plurality of floating capacitors to the output node.

6. The column amplifier of claim 5, wherein the plurality of floating capacitors includes eight floating capacitors, wherein
- in a low-gain 1× configuration of the column amplifier, one of the eight floating capacitors is coupled to the input node via a corresponding first switch of the plurality of first switches, another one of the eight floating capacitors is coupled to the output node via a corresponding second switch of the plurality of second switches, and a remaining six of the eight floating capacitors are coupled to neither the input node nor the output node; and
- in a high-gain 4× configuration of the column amplifier, seven of the eight floating capacitors are coupled to the input node via corresponding first switches of the plurality of first switches, and a remaining one of the eight floating capacitors is coupled to the output node via a corresponding second switch of the plurality of second switches.

7. The column amplifier of claim 5, wherein the plurality of floating capacitors includes eight floating capacitors, wherein—
- in a low-gain 2× configuration of the column amplifier, one of the eight floating capacitors is coupled to the input node via a corresponding first switch of the plurality of first switches, and a remaining seven of the eight floating capacitors are coupled to neither the input node nor the output node; and
- in a high-gain 8× configuration of the column amplifier, seven of the eight floating capacitors are coupled to the input node via corresponding first switches of the plurality of first switches, and a remaining one of the eight floating capacitors is coupled to neither the input node nor the output node.

8. The column amplifier of claim 5, wherein the plurality of floating capacitors includes seven floating capacitors, wherein—
- in a low-gain 1× configuration of the column amplifier, one of the seven floating capacitors is coupled to the input node via a corresponding first switch of the plurality of first switches, another one of the seven floating capacitors is coupled to the output node via a corresponding second switch of the plurality of second switches, and a remaining five of the seven floating capacitors are coupled to neither the input node nor the output node; and
- in a high-gain 3.5× configuration of the column amplifier, six of the seven floating capacitors are coupled to the input node via corresponding first switches of the plurality of first switches, and a remaining one of the seven floating capacitors is coupled to the output node via a corresponding second switch of the plurality of second switches.

9. The column amplifier of claim 5, wherein the plurality of floating capacitors includes seven floating capacitors, wherein—
- in a low-gain 2× configuration of the column amplifier, one of the seven floating capacitors is coupled to the input node via a corresponding first switch of the plurality of first switches, and remaining six of the seven floating capacitors are coupled to neither the input node nor the output node; and in a high-gain 8× configuration of the column amplifier, the seven floating capacitors are coupled to the input node via corresponding first switches of the plurality of first switches.

10. The column amplifier of claim 1, wherein the capacitor array further comprises:

a grounding capacitor coupled to the floating voltage node;

a first switch configured to selectively couple the grounding capacitor to the input node;

a second switch configured to selectively couple the grounding capacitor to ground;

a plurality of grouping capacitors coupled to the floating voltage node; and a plurality of third switches each coupled between adjacent ones of the grouping capacitors.

11. An imaging system, comprising:

a pixel array including a plurality of pixel circuits arranged in rows and columns, wherein each pixel circuit is configured to generate image signals in response to incident light;

a column amplifier coupled to the pixel array, wherein the column amplifier comprises:

an input node coupled to receive image signals from one or more of the pixel circuits, an output node, and an input stage coupled between the input node and the output node, wherein the input stage comprises:

a capacitor array including a first capacitor coupled to the input node, a floating voltage node coupled to the first capacitor, and a second capacitor coupled between the floating voltage node and the output node;

a reset switch coupled between the floating voltage node and the output node; and a transistor having a gate terminal coupled to the floating voltage node, and coupled between the output node and ground; and a comparator having a first input coupled to the output node of the column amplifier and a second input coupled to receive a ramp signal.

12. The imaging system of claim 11, wherein the column amplifier further comprises:

a second input stage coupled between the input node and the output node, wherein the second input stage comprises:

a second capacitor array including a third capacitor coupled to the input node, a second floating voltage node coupled to the third capacitor, and a fourth capacitor coupled between the second floating voltage node and the output node, a second reset switch coupled between the second floating voltage node and the output node, and a second transistor having a gate terminal coupled to the second floating voltage node, and coupled between the output node and ground;

a first switch coupled to the input node, the input stage, and the second input stage, wherein the first switch is configured to selectively couple the input node to either the input stage or the second input stage; and a second switch coupled to the input stage, the second input stage, and the output node, wherein the second switch is configured to selectively couple the transistor or the second transistor to the output node.

13. The imaging system of claim 12, wherein the column amplifier further comprises a third switch coupled to the input stage, the second input stage, and the output node, wherein the third switch is configured to selectively couple (i) the second capacitor and the reset switch or (ii) the fourth capacitor and the second reset switch to the output node.

14. The imaging system of claim 12, wherein the column amplifier further comprises:

a third switch coupled to the input stage, the second input stage, and the output node, wherein the third switch is configured to selectively couple the second capacitor or the fourth capacitor to the output node; and a fourth switch coupled to the input stage, the second input stage, and the output node, wherein the fourth switch is configured to selectively couple the reset switch or the second reset switch to the output node.

15. The imaging system of claim 11, wherein the capacitor array further comprises:

a plurality of floating capacitors coupled to the floating voltage node;

a plurality of first switches, each configured to selectively couple a corresponding one of the plurality of floating capacitors to the input node; and a plurality of second switches, each configured to selectively couple a corresponding one of the plurality of floating capacitors to the output node.

16. The imaging system of claim 15, wherein the plurality of floating capacitors includes eight floating capacitors, wherein— in a low-gain 1× configuration of the column amplifier, one of the eight floating capacitors is coupled to the input node via a corresponding first switch of the plurality of first switches, another one of the eight floating capacitors is coupled to the output node via a corresponding second switch of the plurality of second switches, and a remaining six of the eight floating capacitors are coupled to neither the input node nor the output node; and in a high-gain 4× configuration of the column amplifier, seven of the eight floating capacitors are coupled to the input node via corresponding first switches, and a remaining one of the floating capacitors is coupled to the output node via a corresponding second switch of the plurality of second switches.

17. The imaging system of claim 15, wherein the plurality of floating capacitors includes eight floating capacitors, wherein— in a low-gain 2× configuration of the column amplifier, one of the eight floating capacitors is coupled to the input node via a corresponding first switch of the plurality of first switches, and a remaining seven of the eight floating capacitors are coupled to neither the input node nor the output node; and in a high-gain 8× configuration of the column amplifier, seven of the eight floating capacitors are coupled to the input node via corresponding first switches of the plurality of first switches, and a remaining one of the eight floating capacitors is coupled to neither the input node nor the output node.

18. The imaging system of claim 15, wherein the plurality of floating capacitors includes seven floating capacitors, wherein— in a low-gain 1× configuration of the column amplifier, one of the seven floating capacitors is coupled to the input node via a corresponding first switch of the plurality of first switches, another one of the seven floating capacitors is coupled to the output node via a corresponding second switch of the plurality of second switches, and a remaining five of the seven floating capacitors are coupled to neither the input node nor the output node; and in a high-gain 3.5× configuration of the column amplifier, six of the seven floating capacitors are coupled to the input node via corresponding first switches of the plurality of first switches, and a remaining one of the seven floating capacitors is coupled to the output node via a corresponding second switch of the plurality of second switches.

19. The imaging system of claim 15, wherein the plurality of floating capacitors includes seven floating capacitors, wherein— in a low-gain 2× configuration of the column amplifier, one of the seven floating capacitors is coupled to the input node via a corresponding first switch of the plurality of first switches, and remaining six of the seven floating capacitors are coupled to neither the input node nor the output node; and in a high-gain 8× configuration of the column amplifier, the seven floating capacitors are coupled to the input node via corresponding first switches of the plurality of first switches.

20. The imaging system of claim 11, wherein the capacitor array further comprises:

a grounding capacitor coupled to the floating voltage node;

a first switch configured to selectively couple the grounding capacitor to the input node;

a second switch configured to selectively couple the grounding capacitor to ground;

a plurality of grouping capacitors coupled to the floating voltage node; and a plurality of third switches each coupled between adjacent ones of the grouping capacitors.

* * * * *